United States Patent [19]

Wittenberg et al.

[11] Patent Number: 5,204,966

[45] Date of Patent: Apr. 20, 1993

[54] SYSTEM FOR CONTROLLING ACCESS TO A SECURE SYSTEM BY VERIFYING ACCEPTABILITY OF PROPOSED PASSWORD BY USING HASHING AND GROUP OF UNACCEPTABLE PASSWORDS

[75] Inventors: David K. Wittenberg, Hudson, Mass.; Jerrold S. Leichter, Stamford, Conn.

[73] Assignee: Digital Equipment Corporation, Maynard, Mass.

[21] Appl. No.: 491,431

[22] Filed: Mar. 9, 1990

[51] Int. Cl.[5] ............................................. G06F 11/00
[52] U.S. Cl. ............................. 395/800; 364/DIG. 1; 364/260.81; 364/286.4; 364/286.5; 364/184; 380/25; 395/575
[58] Field of Search ............................. 395/800, 575; 380/23-25; 364/184

[56] References Cited

U.S. PATENT DOCUMENTS

| | | | |
|---|---|---|---|
| 3,394,246 | 7/1968 | Goldman | 235/380 |
| 3,702,987 | 11/1972 | Twyford | 340/825.33 |
| 3,798,602 | 3/1974 | Hynes, Jr. | 340/825.33 |
| 4,290,105 | 9/1981 | Cichelli et al. | 364/200 |
| 4,295,124 | 10/1981 | Roybal | 364/900 |
| 4,476,468 | 10/1984 | Goldman | 235/468 |
| 4,498,148 | 2/1985 | Glickman | 364/900 |
| 4,503,514 | 3/1985 | Urquhart | 364/900 |
| 4,538,240 | 8/1985 | Carter et al. | 364/754 |
| 4,589,081 | 3/1986 | Massa et al. | 364/554 |
| 4,605,820 | 8/1986 | Campbell, Jr. | 380/24 |
| 4,694,492 | 9/1987 | Wirstrom et al. | 380/23 |
| 4,730,348 | 3/1988 | MacCrisken | 375/122 |
| 4,908,861 | 3/1990 | Brachtl et al. | 380/25 |
| 4,924,515 | 5/1990 | Matyas et al. | 380/25 |
| 5,005,200 | 4/1991 | Fischer | 380/30 |
| 5,103,478 | 4/1992 | Matyas et al. | 380/25 |

FOREIGN PATENT DOCUMENTS

WO87/07061 11/1987 PCT Int'l Appl.

1537759 1/1979 United Kingdom.

OTHER PUBLICATIONS pp. 7-3 and 7-4 of VMS Version 5.2 Upgrade and Installation Procedures Manual, available from Digital Equipment Corporation, Maynard Mass., as order No. AA-NG61A-TE.

Novell NetWare Supervisor Reference Manual, available from Novell, Inc., 122 East 1700 South, P.O. Box 5900 Provo, Utah 84601, (c) 1988.

Sedgewick, *Algorithms*, Chapter 16.

Lydia Kronsjo, *Algorithms: Their Complexity and Efficiency*, 2nd Edition, Chapter 9, pp. 282-321.

Larry Cater et al. "Exact and Approximate Membership Testers", 10th STOC, May 1978, pp. 59-65.

Bloom, "Space/Time Trade-offs in Hash Coding with Allowable Errors", Communications of the ACM, vol. 13, No. 7, Jul. 1970, pp. 422-426.

*Primary Examiner*—Thomas C. Lee
*Assistant Examiner*—Mehmet Geckil
*Attorney, Agent, or Firm*—Fish & Richardson

[57] ABSTRACT

Methods and apparatus for verifying the acceptability of a password proposed by a user of a secure system. The system stores a compressed version of a group of unacceptable passwords in a table of indicators. A mapper assigns indicators to passwords, such that more than one password may be mapped to a indicator. To initialize the system, an initializer applies the mapper to each unacceptable password of the group, and sets the indicators of the table that are assigned to each unacceptable password. Subsequently, a verifier applies the mapper to a proposed password and checks whether the indicator assigned to the proposed password is set. If the indicator is not set, it is determined without error that the proposed password is not in the group of unacceptable passwords, and may thus be assigned privileges in the secure system.

37 Claims, 3 Drawing Sheets

```
1 1 0 0 0 1 0 0 0 0 1    0
1 2 3 4 5 6 7 8 9 10 11 ..... N
```

```
1 0 0 0 0 0 0 0 0 0 1 0    1
A B C D E F G H I J K ... Z
```
TABLE ADDRESSES
$h(K_{A-Z})$

| BYTE # | 1 | 2 | 3 | 4 | 5 | 6 | 7 | 8 | | 1 | 2 | 3 | 4 | 5 | 6 | 7 | 8 |
|---|---|---|---|---|---|---|---|---|---|---|---|---|---|---|---|---|---|
| $V_1=$ | J | e | r | r | o | l | d | S | $V_2=$ | L | e | i | c | h | t | e | r |
| $V_3=$ | D | a | v | i | d | K | W | i | $V_4=$ | t | t | e | n | b | e | r | g |
| $V_5=$ | D | i | g | i | t | a | l | E | $V_6=$ | q | u | i | p | m | e | n | t |

FIG. 3

| 1 | 2 | 3 | 4 | 5 |
|---|---|---|---|---|
| S | u | s | a | n |

FIG. 4

| 1 | 2 | 3 | 4 | 5 | 6 |
|---|---|---|---|---|---|
| 5 | S | u | s | a | n |

FIG. 5

| 1 | 2 | 3 | 4 | 5 | 6 | 7 |
|---|---|---|---|---|---|---|
| 5 | S | u | s | a | n | ? |

FIG. 6

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| 5 | S | u | s | a | n | ? | 5 | S | u | s | a | n | ? | 5 | S | u | s | a | n | ? | 5 | S | u |

K1, K2, K3

| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|---|---|---|---|---|
| s | a | n | ? | 5 | S | u | s | a | n | ? | 5 | S | u | s | a | n | ? | 5 | S | u | s | a | n |

$H_j = DES(K_j, V_j)$ $H_1 = DES(\text{"5Susan?5"}, \text{"Jerrold S"})$
$H_2 = DES(\text{"?usan5Su"}, \text{"Leichter"})$
⋮
$H_6 = DES(\text{"e?5Susan"}, \text{"quipment"})$

FIG. 8

$h_1 =$ 1st half $H_1$
$h_2 =$ 2nd half $H_1$
$h_3 =$ 1st half $H_2$
$h_4 =$ 2nd half $H_2$
⋮
$h_{11} =$ 1st half $H_6$
$h_{12} =$ 2nd half $H_6$

FIG. 9

Bit $= h_1$ MOD N
Bit $= h_2$ MOD N
Bit $= h_6$ MOD N
Bit $= h_{11}$ MOD N

N = length of hash table (in bits)

FIG. 10

SYSTEM FOR CONTROLLING ACCESS TO A SECURE SYSTEM BY VERIFYING ACCEPTABILITY OF PROPOSED PASSWORD BY USING HASHING AND GROUP OF UNACCEPTABLE PASSWORDS

BACKGROUND OF THE INVENTION

The present invention relates to password security systems.

Many secure systems rely on the use of passwords to verify the identity or credentials of persons (or other objects such as computing processes) that request access to the system. An example of such a system is a multi-user computer system.

In those password-based security systems, security may be compromised if the passwords are easy to guess (common names are often good guesses for passwords), or if the passwords are written down so that they can be found by unauthorized users.

Passwords can be selected by the system management or by the users themselves. In either scheme there are strong possibilities for breaches of security.

System management may impose "secure" passwords that are not easy to guess (e.g., random sequences of nonsense syllables). However, the resulting passwords are often obscure and difficult to memorize. Typically, the users will write down such passwords rather than attempt to remember them. These written records can be found and misused by unauthorized persons.

In the alternative, the users may be allowed to select their own passwords. User-selected passwords are more likely to be memorizable, and thus the users will be less tempted to write them down. However, user-selected passwords are often easy to guess.

In one known scheme, the user chooses his or her password, but their "security" (or lack of obviousness) is verified by the system. In this way, all of the passwords used by the system are memorizable (at least to the user that chose them) but are also unobvious. Implementing such a scheme requires a method for checking the "validity" of passwords. One known method compares the password to a look-up table of invalid passwords (for example, the look-up table may include example passwords used in the software documentation). If a password is found in the table, the user is asked to change the password.

SUMMARY OF THE INVENTION

In general, the invention features verifying the acceptability of a password proposed by a user of a secure system. An approximate membership tester is used to test whether the proposed password is a member of a group of unacceptable passwords. When this approximate membership tester tests the membership of a proposed password in the group of unacceptable passwords, it may erroneously indicate membership of the proposed password in the group, but it cannot erroneously indicate non-membership of the proposed password in the group. Based upon the indication of the approximate membership tester, it can be determined without error if the proposed password is not in the group of unacceptable passwords and thus may be assigned privileges in the secure system.

Preferred embodiments include the following features.

The group of unacceptable passwords is stored in a table of indicators through the use of a mapping function that maps passwords to indicators. This mapping function may map more than one password to one indicator. To initialize the table, the mapping function is applied to each unacceptable password, and the indicators assigned to each of the unacceptable passwords are set. Subsequently, the mapping function is applied to the proposed password, and the indicator assigned to the proposed password is checked. If the indicator is not set, it is determined without error that the proposed password is not in the group of unacceptable passwords.

The indicators and group of unacceptable passwords are provided in a manner enabling a user to add further unacceptable passwords to the group and thereby vary which indicators are set.

When the proposed password is determined to be acceptable, the proposed password is added to the group of unacceptable passwords and the indicator assigned to the proposed password is set, so that the proposed password will not be accepted a second time.

From time to time, the privileges of a user's password are at least partially disabled, and the user is required to propose a new (acceptable) password to regain these privileges. This forces the users to change their passwords and (because passwords will not be accepted twice) also helps to "weed out" unacceptable passwords that were initially omitted from the group.

A common table of indicators is used by a network of secure systems to verify the acceptability of passwords, so that any one password may only be assigned privileges in one of the secure systems. In this embodiment, when a password is proposed by a user to one of the secure systems, that secure system checks the acceptability of the proposed password in the manner described above and using the common table of indicators. If the secure system finds the proposed password to be acceptable, it adds the proposed password to the group of unacceptable passwords and sets the corresponding indicator in the common table. Thereafter, if this password is again proposed to any of the secure systems, it will not be acceptable and will not be assigned privileges.

The indicators are bits in a hash table and the mapping function is a hash function.

The processing performed by the hash function includes normalizing the text string for a password to a predetermined length. The text string is normalized by: (1) appending to the text string a character related to the length of the text string, creating a modified text string; (2) if the length of the modified text string is even, adding a character to the modified text string, thus forcing the text string to have an odd length; and (3) appending the odd-length text string to itself until it exceeds a given length, and then truncating it to the given length.

The normalized text string is then divided into pieces, and one or more pieces are used as a key to encrypt a predetermined input. The encrypted output is then used to address bits in the hash table. In order that the bits in the hash table cannot be used to determine the passwords in the group of unacceptable passwords, the encryption is performed in accordance with a cryptographic technique secure against plain-text attack, such as the Data Encryption Standard.

To reduce the number of passwords that are incorrectly deemed unacceptable, the encrypting step is repeated N times on N of the pieces of the normalized text string to create N encrypted outputs. These N encrypted outputs are then split to generate final outputs, and one or more bit addresses in the hash table are computed from one or more final outputs as the modulo of the final output with the length of the hash table.

Other features and advantages of the invention will be appreciated from the following description of the preferred embodiment and from the claims.

BRIEF DESCRIPTION OF THE DRAWING

We first briefly describe the drawings:

FIG. 1 is a block diagram of a validity checker in practice of the present invention.

FIG. 3 shows formation of values $V_{1-6}$.

FIGS. 4 through 7 illustrate the normalization of a password and the formation of keys $K_{1-6}$.

FIG. 8 shows formation of outputs $H_{1-6}$.

FIG. 9 shows formation of outputs $h_{1-12}$.

FIG. 10 shows formation of bit addresses.

DESCRIPTION OF THE PREFERRED EMBODIMENTS

Figures 2, 11:
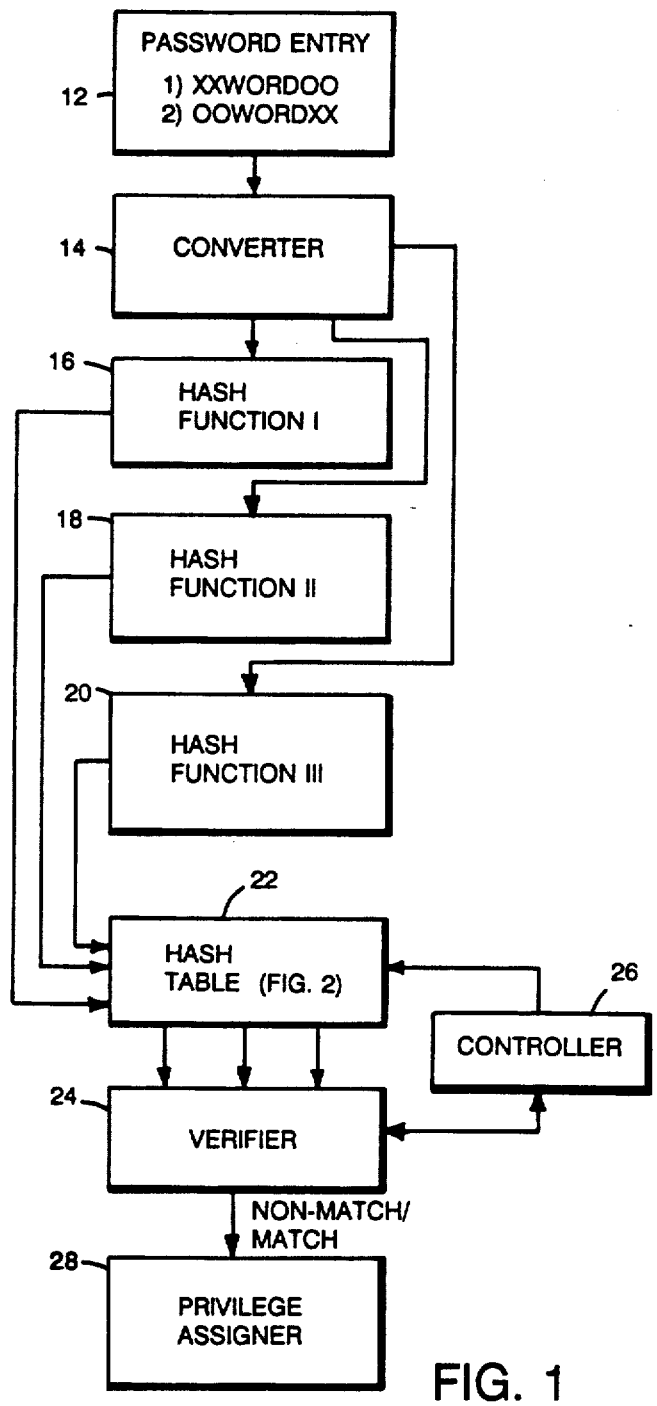
FIG. 2 is a detail of the hash table of FIG. 1.
FIG. 11 shows bits turned on in the hash table.

Known password security systems compare passwords to a look-up table. This operation requires what is generally known as a membership tester. Membership testers fall into either of two general categories: exact or approximate testers. The exact tester is presumed to act without error, and is preferred when there are no limitations placed on use of system resources. In an approximate membership tester one presumes some degree of "allowable error" as the trade off for substantially reduced use of system resources.

Hashing is one known technique that may be used to create approximate membership testers. In this technique, a "hash table" stores a compressed representation of the members of the set that is to be tested. Each item in the set (represented by a numerical key, which may, for example, be the ASCII codes for a text string) is subjected to an arithmetic transformation (known as a "hash function"); the function output indicates a hash table address. A bit is turned on (e.g., raised to logic 1) in the hash table when it is addressed. (Note that a prerequisite of a good transformation function is that it distributes its outputs as evenly as possible over the entire table. While the transformation function output distribution is not bound by any pattern, it is usually desirable if the output appears random.) When all of the members of the set have been placed in the table, a candidate item (i.e., an item which may or may not be in the set, to be determined by the membership test) is subjected to the hash function (arithmetic transformation). Next, the resulting table address is checked. If the bit at that address is set, the candidate item is deemed to be a member of the set; otherwise, it is not.

When hashing is used to create an approximate membership tester, the mapping between items and addresses in the hash table is not unique. That is, the hash function does not map every possible item to a unique associated table address. This non-unique mapping is used because the number of possible items may be much larger than the number of items in the set that is to be tested. (Consider, for example, a membership tester being used as a spelling checker. The membership tester determines if a word being spell checked appears in a dictionary of correctly spelled words. The number of possible text strings that have a length of 20 characters or less is clearly much larger than the number of words that are listed in any dictionary.) Using a non-unique mapping, the number of bits in the hash table may be significantly less than the number of possible items, reducing storage requirements. As a result, however, two or more different items may "hash" to the same table address (i.e., they may result in the same hash function output). When this occurs, it is commonly referred to as a "collision".

For example, in an approximate membership tester using a hash function that operates on the middle four characters of items identified by 8-character text strings, if two text strings have the same middle four characters (e.g., XXWORDOO and OOWORDXX), then a collision will occur.

Collisions in approximate membership testers generate some level of "known" or "allowable" error in the membership test. Consider the above example of a spelling checker. In this case, a collision between a misspelled word and a correctly spelled word results in an indication that the misspelled word is correctly spelled, which is clearly an error.

Carter, et al., in "Exact and Approximate Membership Testers", Proceedings of 10th Annual ACM Symposium on Theory of Computing (STOC), May, 1978, at p. 62, describes the possibility of such errors in an approximate membership tester for a vocabulary V. The tester has an associated preprocessor that digests V and produces a compressed representation of a superset W of V. The input to the tester is the compressed representation W and a possible word s; the membership tester estimates whether s is in V by actually computing if s is in W. Under the assumption that all errors are equally likely, the undetected error probability is (w-v)/(u-v), where w is the size of W, v is the size of V, and u is the number of possible words. In this tester, the authors seek to achieve an undetected error probability of $2^{-r}$ based upon the number v of vocabulary words and a reliability exponent r, for a given universe size u.

In the present invention, to reduce the amount of system resources required to store the password look-up table, an approximate membership tester is used to determine if a user password is one of the unacceptable passwords in the look-up table. Normally, the use of an approximate membership tester would be associated with "allowable errors". However, as applied in the invention, the errors of the approximate membership tester do not compromise the security of the system. When the approximate membership tester erroneously indicates that a user's password is in the look-up table, the result is simply an inconvenience to the user, who must then choose another password. However, the approximate membership tester will never erroneously indicate that a user's password is not in the look-up table. Therefore, under no circumstances will unacceptable passwords that are in the look-up table will be used in the system.

In the invention, the approximate membership test is performed by hashing. This provides the added benefit that the look-up table is compressed and somewhat encrypted. The level of encryption provided by the invention depends upon the hash function used. A particularly secure method for hashing the passwords is described below.

Encrypting the list of unacceptable passwords is advantageous because, without access to the list, would-be invaders of the system do not know which passwords have been deemed "insecure", and thus may spend time guessing obvious passwords that are not in use. Note that an encryption requirement precludes the possibility of simply re-using the spelling dictionary (or any other file already on the system) as the look-up table. One difficulty this may cause is that a comprehensive password look-up table would be about the same size as a spelling dictionary file, and would consume excessive system resources; however, in the invention, the use of hashing compresses the look-up table so that it has a reasonable size.

In a simplified embodiment of the present invention, one or more invalid (not secure) passwords (e.g., from the above example, the word XXWORDOO) are input to the system, and then numerical representatives of the passwords (such as derived from ASCII equivalents for the passwords) are submitted as a key $K_i$ to a single hash function $h(K)$. The output of the hash function indicates an address $h(K_i)$ in a hash table, and a bit at that address can be thus turned on. Once a bit is turned on, it remains on. A turned on bit indicates that one or more passwords are no longer available for use. This is because any password which generates a table address of a turned on bit (e.g., from the above discussion, the word OOWORDXX) is rejected as not valid; any other password is declared to be valid. Hash table size, and thus the likelihood of collisions, is selected entirely at the programmer's discretion.

A more robust embodiment of the invention is shown in FIG. 1. In this embodiment, fewer collisions will occur resulting in a greater number of passwords being deemed valid by the tester. Two sample passwords, an invalid password XXWORDOO and a valid password OOWORDXX are shown as they are entered into the system at keyboard input 12 and are converted to a number by converter 14. In this embodiment, an ASCII number corresponding to the input passwords is output by converter 14 to three hash function units 16, 18, 20. (Each hash function is assumed to be different. Also, the number of hash function units used is an arbitrary design choice.)

To load the table with compressed representations of invalid passwords, the outputs of the hash function units are applied to, for example, a 26-bit table 22; controller 26 directs table 22 to turn on respective bits. In the figure, as the invalid password "XXWORDOO" is submitted to each of the three hash functions, respective addresses A, J, and Z are output by each respective hash function unit. As a result, bits A, J and Z are turned on in the hash table shown in FIG. 2. Further invalid passwords may be added by repeating these steps. Note that, during this process, two invalid passwords may have a collision, that is, the outputs of the hash function units may happen to address one or more common bits in the table. If this occurs, because the common bits are already set, they do not need to be set to add the later invalid password to the table.

Thereafter, candidate passwords proposed by a user may be checked by comparison with the hash table. If, when a candidate password is processed, the outputs of the three hash function units 16, 18 and 20 address bits in the table which are turned on (in the simple example of FIG. 1, the bits A, J, and Z), in any order, and even if based upon one or more collisions, verifier 24 (coupled to the hash table and hash function units) will indicate a "match". This tells the privilege assigner 28 that the candidate password is not valid, i.e., not secure.

Thus each candidate password which is submitted to the system will be considered a valid password if it includes at least one hash function output indicating an address other than the turned-on addresses (in the simple example of FIG. 1, bits A, J, and Z). In other words, if at least one bit which is as of yet not turned on in the table is addressed, then the password is indicated as secure/valid, and privilege asssigner 28 will allow the user to retain it for secure use as a password. However, when no new bits are addressed, then a "match" is declared (by comparator 24) between the candidate password and the hashing table contents. When a match is declared, the candidate password is indicated to the user as invalid, and a new candidate password must be selected and tested.

For example, when a proposed password "OOWORDXX" is processed, the outputs of the three hash functions 16, 18, 20 address the three bits A, H and K in the hash table. Although bit A was turned on by the entry of the invalid password "XXWORDOO" in the hash table, because the bits H and K were not turned on, the password "OOWORDXX" is deemed valid. This illustrates the benefit of a more robust system using multiple hash functions, i.e., that with three hash functions it is possible to distinguish between the two sample passwords by comparing bit address combinations (AJZ and AHK) whereas a system with only the first hash function would have generated an indistinguishable collision with the identical addresses (A, A). This feature enables a finding of validity of a greater number of secure candidate passwords.

In practice of one embodiment of the invention, a user selects a candidate password, the password is submitted to the validity checking feature of the invention, and the candidate password is indicated as valid/invalid to the user. To initialize the table with invalid passwords, any of the following three options may be implemented. First, a vendor can preload a hash table with predetermined invalid (not secure) or common words. For security purposes, no external access is afforded to the table, and the pre-loaded table does not change over time. Candidate passwords are rejected if a match is declared; however, more than one user can select and use the same valid/secure password (i.e., not in the table), since the table is never updated.

In a second option, a security officer can be allowed to add invalid passwords to the table (for example, common words in the particular field of business of the users), but other than these modifications, the table is not changed. Therefore, more than one user could still select and use the same valid password.

The above two methods rely on a few persons to generate a comprehensive list of obvious passwords. As a result, there is a strong possibility that some obvious passwords may be omitted from the table. In the worst case, many users may choose one or more of these omitted obvious passwords, reducing security.

To reduce this possibility, a third option is preferred. In this option, each password that is deemed valid is added to the hash table, rendering that password invalid for future selection. Hence more than one user cannot select the same password. In addition, as above, a security officer can be allowed to add known invalid words to the table.

Figure 12:
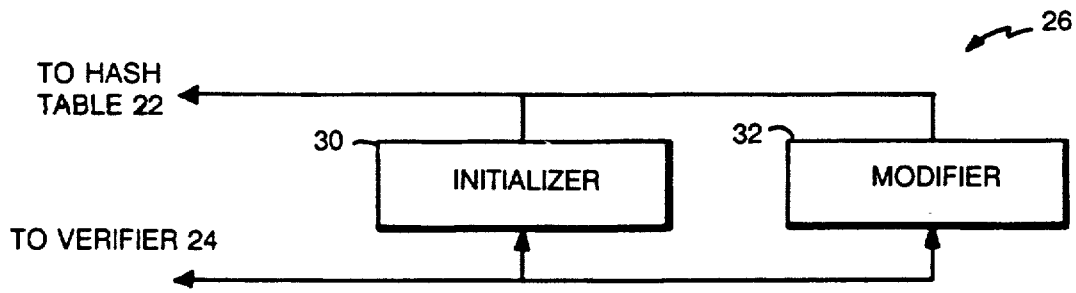
FIGS. 12-14 detail embodiments of controller 26, converter 14, and hash function units 13 of FIG. 1.

Referring to FIG. 12, in an embodiment of the third option, controller 26 of FIG. 1 includes an initializer 30 that sets bits in the hash table corresponding to invalid passwords (as described above), and a modifier 32 that sets the bits assigned to a password which verifier 24 determines to be valid.

In this third option, only one user may use a given password, if the table does not initially include all obvious passwords (even with the obvious words added by a knowledgeable security officer), some users will be able to use (different) obvious passwords. For this reason, it may be valuable to periodically force all users to change their passwords. To force a user to change, the system may simply prevent him or her from performing any activities on the system until he or she suggests an acceptable new password—for security reasons, this must be done after the user has already logged in with his or her old password. When forced to change, the users may not re-use their passwords (because they were added to the table when first deemed valid), and thus they must suggest new, previously unused passwords. Assuming some users may initially choose obvious passwords not in the table, this process will eventually "weed out" any obvious passwords that were omitted from the table and selected by the users, thus obtaining a higher degree of password security.

In a further extension of the third option, in a system with multiple computers, a central hash table prevents the user from choosing the same valid password on multiple computers. This prevents a local breach from becoming a general breach of security.

As discussed above, encryption of the look-up table is quite important to overall system security. The enhancements of the third option increase the importance of encryption because, in the third option, the table is constantly being updated, and the updates correspond exactly to the passwords have recently come into use. In a preferred embodiment of the invention, which is particularly effective at guaranteeing table security, cryptographically secure hash functions are used. These functions preferably incorporate the known DES (Data Encryption Standard) algorithm. In this embodiment, candidate passwords are encrypted as part of the hashing operation. The encryption is performed in accordance with the equation:

$$H = DES(K, V)$$

where the output H (which is a hash value) is the result of the DES algorithm applied with key K to the input value V. The respective lengths of the key K, the input value V, and the output H are selected to be 8 bytes in this example, subject to the restrictions of DES.

The encryption is performed as follows: the key K is derived from the password, and it is used to encrypt a predetermined input value V. Because the key is generated from the password and changes with every encryption, no information about a password can be determined as a practical matter from the encrypted hash value in the table. This is because, in encryption algorithms consistent with DES, even if an attacker knows the output H and input V for the encryption process, it is not possible to determine the key K that was used. An encryption algorithm that satisfies this requirement is secure against "known plain text attack".

In one particular embodiment, the password is used to create six keys $K_{1-6}$ that encrypt six input values $V_{1-6}$ to create six outputs $H_{1-6}$.

Referring to FIG. 3, the six input values $V_{1-6}$ are generated by selecting three arbitrary 16-character strings, which are dissected. Thus in one example, $V_1$ is "JerroldS", and the bytes of $V_1$ are: the byte for "J", followed by the byte for "e", etc. $V_2$ is "Leichter", and so on. In this example, six values $V_{1-6}$ have been created for use in the encryption process, although the invention is not limited to such number.

Prior to creating the six keys $K_{1-6}$, the length of each password must be normalized. Referring to FIG. 4, for example, consider that the (obvious and therefore invalid) password P = "Susan", which has a length of five bytes (i.e., five characters), is to be placed in the table. First, referring to FIG. 5, a character representing the length of the password ("5") is pre-pended to the password, creating a 6-character password P' = "5Susan".

Figure 13:
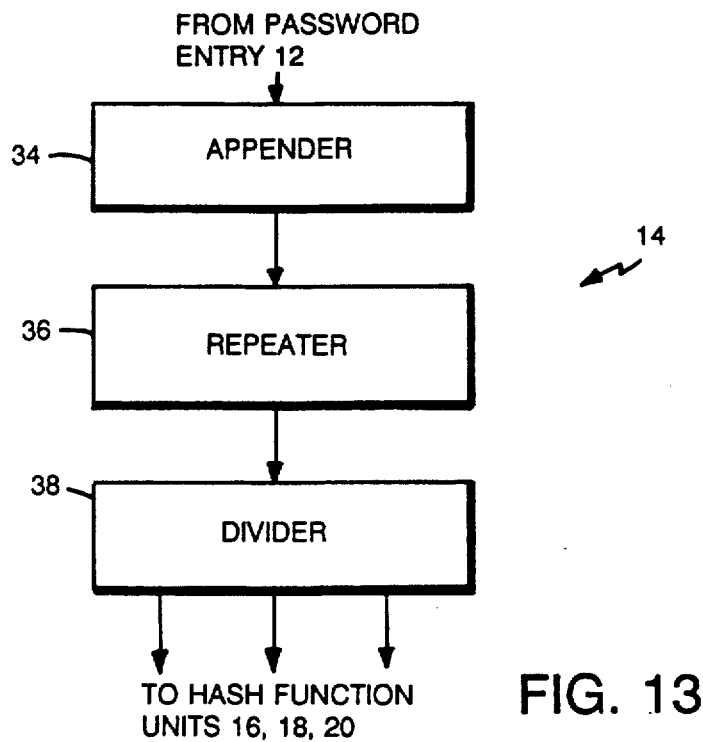

Next, referring to FIG. 6, if the length of P' is even, a character, such as "?", is appended to the password, thus creating a seven character password P''. Referring to FIG. 13, in one embodiment these operations may be performed by an appender 34 in converter 14 of FIG. 1. Finally, referring to FIG. 7, password P'' is appended to itself as needed until its length reaches or exceeds 48 bytes. This operation is performed by repeater 36 (FIG. 13) of converter 14 (FIG. 1). The first 48 bytes are divided into six 8-byte segments to obtain six keys $K_{1-6}$ the first eight bytes are $K_1$, the next eight are $K_2$, and so on. This operation is performed by divider 38 (FIG. 13) of converter 14 (FIG. 1). (Forcing the length of password P'' to be odd and at least of a given length—perhaps at least six bytes—assures distinctness of the keys.)

Figure 14:
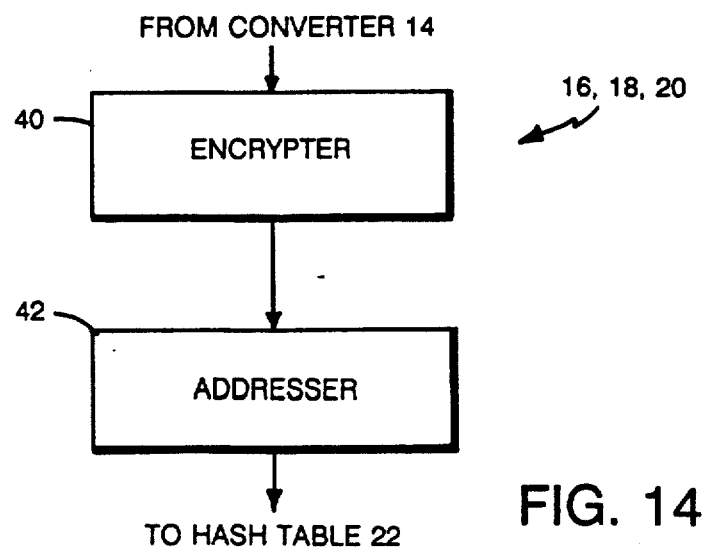

The six keys $K_{1-6}$ and six predetermined input values $V_{1-6}$ are then input into six separate DES encryptions. Referring to FIG. 14, in one embodiment these encryptions may be performed by an encrypter 40 in each of the hash function units 16, 18, 20 of FIG. 1. More particularly, referring to FIG. 8, six outputs $H_{1-6}$ are generated by applying the conventional DES function to the previously computed keys $K_{1-6}$ and the predetermined values $V_{1-6}$. In FIG. 9, the six outputs $H_{1-6}$ are split into twelve 32-bit values $h_{1-12}$. Finally, referring to FIG. 10, bit addresses are computed as the modulo of the split values $h_{1-12}$ with the length N of the hash table. Some or all of the bit addresses (e.g., the first, second, sixth, and eleventh) may then be used to set bits in the hash table. These functions may be performed by an addresser 42 (FIG. 14) in each of the hash function units 16, 18, 20 (FIG. 1). In preferred embodiments, all bit addresses are used. Thus, for example, the password "Susan" may result in bits 1, 2, 6 and 11 being turned on in the hash table illustrated in FIG. 11. Any other password which would cause these same bits to be turned on will be rejected as not valid/secure.

One feature of the foregoing is that the list of passwords entered into the table cannot be reconstructed from the table alone. Thus the table can be transported without the need for extra security. A second feature is that knowing the changes made to the table as the result of adding a single password will not enable determination of the password. Thus the changes can be transported without the need for extra security.

Other embodiments are within the following claims.

We claim:

1. A method for controlling access to a secure system by verifying acceptability of a proposed password from a user of said secure system, comprising the computer-implemented steps of:

providing a group of unacceptable passwords, providing an approximate membership tester that tests membership of a candidate password in said group of unacceptable passwords in a manner that may erroneously indicate that said candidate password is a member of said group but cannot erroneously indicate that said candidate password is not a member of said group, testing whether said proposed password is a member of said group of unacceptable passwords by applying said approximate membership tester, whereby, if said approximate membership tester indicates that said proposed password is not a member of said group, it is determined without error that said proposed password is not in said group of unacceptable passwords, and may thus be assigned privileges in said secure system, if said approximate membership tester indicates that said proposed password is not a member of said group, allowing said user to access said secure system, and if said approximate membership tester does not indicate that said proposed password is not a member of said group, frustrating said user from accessing said secure system.

2. A method for controlling access to a secure system by verifying acceptability of a proposed password from a user of said secure system, comprising the computer-implemented steps of:

providing a table of indicators, providing a mapping function that assigns one or more indicators to a password such that one indicator may be assigned to more than one password, applying said mapping function to one or more unacceptable passwords, and setting all indicators assigned by said mapping function to said unacceptable passwords, applying said mapping function to said proposed password and checking whether an indicator assigned by said mapping function to said proposed password is not set, whereby, if an indicator assigned by said mapping function to said proposed password is not set, it is determined without error that said proposed password is not one of said unacceptable passwords and therefore is acceptable, if said proposed password is acceptable, allowing said user to access said secure system, and if said proposed password is not acceptable, frustrating said user from accessing said secure system.

3. The method of claim 2, further comprising the computer-implemented step of:

if said proposed password is acceptable, assigning privileges in said secure system to said proposed password.

4. The method of claim 3 further comprising the computer-implemented steps of:

if said proposed password is acceptable, setting all said indicators assigned by said mapping function to said proposed password such that said proposed password will not be acceptable if subsequently proposed, and at least partially disabling privileges of a previously privileged password so as to require a user possessing said previously privileged password to propose a new password.

5. The method of claim 2, further comprising the computer-implemented step of:

enabling a user to apply said mapping function to further unacceptable passwords and set all said indicators assigned by said mapping function to each of said further unacceptable passwords.

6. The method of claim 2, further comprising the computer-implemented step of:

if said proposed password is acceptable, setting all said indicators assigned by said mapping function to said proposed password such that said proposed password will not be acceptable if subsequently proposed.

7. The method of claim 2 adapted to verify acceptability of passwords proposed by users of a plurality of secure systems linked by a communications system, wherein said secure systems use a common table of indicators, said secure systems verify acceptability of proposed passwords using said common table of indicators according to the method of claim 2, and if a given secure system determines that a proposed password is acceptable, said given secure system sets all said indicators assigned by said mapping function to said proposed password, such that said proposed password will not be acceptable if subsequently proposed by a user of any of said secure systems, whereby a password which is acceptable will be accepted by only one of said secure systems.

8. The method of claim 2 wherein said mapping function comprises an encryption algorithm.

9. The method of claim 2 wherein said indicators are bits in a hash table and said mapping function is a hash function.

10. The method of claim 9 wherein said hash function comprises normalizing a text string for a password to a standard format to create a normalized text string.

11. The method of claim 10 wherein said standard format has a predetermined length.

12. The method of claim 10 wherein said text string has a length, and said normalizing comprises appending to said text string a character related to said length of said text string, creating a modified text string.

13. The method of claim 12 wherein said normalizing further comprises selectively adding a character to said modified text string, creating a twice modified text string having an odd length.

14. The method of claim 13 wherein said normalizing further comprises appending said twice modified text string to itself to create a thrice modified text string which exceeds a given length, and then truncating said thrice modified text string to said given length, creating said normalized text string.

15. The method of claim 10 or 14 wherein said hash function further comprises dividing said normalized text string into pieces, encrypting a predetermined input to an encrypted output using one or more of said pieces as an encryption key, and addressing bits in said hash table with said encrypted output.

16. The method of claim 15, further comprising the computer-implemented step of:

if said proposed password is acceptable, setting all said indicators assigned by said mapping function to said proposed password such that said proposed password will not be acceptable if subsequently proposed, and wherein said encrypting is performed in accordance with a cryptographic technique secure against known plain-text attack, whereby an attacker who monitors changes to said hash table and thereby learns that one or more said indicators are assigned to a password, cannot determine said password from said indicators.

17. The method of claim 15 wherein
said hash table has a length,
said encrypting step is repeated N times on N of said pieces to create N encrypted outputs,
said N encrypted outputs are split to generate final outputs, and
one or more bit addresses in said hash table are computed from one or more of said final outputs by computing a modulo quotient of a final output with said length of said hash table.

18. The method of claim 16 wherein said cryptographic technique is the Data Encryption Standard.

19. Apparatus for controlling access to a secure system by verifying acceptability of proposed password from a user of said secure system, comprising
a stored table of indicators,
a mapper that assigns one or more indicators to a password such that one indicator may be assigned to more than one password,
an initializer that applies said mapper to one or more unacceptable passwords, and sets all indicators assigned by said mapper to said unacceptable passwords, and
a verifier that applies said mapper to said proposed password and checks whether any indicator assigned by said mapper to said proposed password is not set, and,
if an indicator assigned by said mapper to said proposed password is not set, determines without error that said proposed password is not one of said unacceptable passwords and therefore is acceptable, and allows said user to access said secure system, otherwise,
if an indicator assigned by said mapper to said proposed password is set, determines that said proposed password is unacceptable and frustrates said user from accessing said secure system.

20. The apparatus of claim 19, further comprising
a privilege assigner that assigns privileges in said secure system to said proposed password, said privilege assigner being invoked if said verifier determines that said proposed password is acceptable.

21. The apparatus of claim 20 further comprising
a modifier that applies said mapper to said proposed password and sets all said indicators assigned by said mapper to said proposed password, said modifier being invoked if said verifier determines that said proposed password is acceptable, such that said proposed password will not be acceptable if subsequently proposed, and wherein
said privilege assigner at least partially disables privileges of a previously privileged password so as to require a user possessing said previously privileged password to propose a new password.

22. The apparatus of claim 19, further comprising
a modifier that enables a user to apply said mapper to further unacceptable passwords and set all said indicators assigned by said mapper to each of said further unacceptable passwords.

23. The method of claim 19, further comprising
a modifier that applies said mapper to said proposed password and sets all said indicators assigned by said mapper to said proposed password, said modifier being invoked if said verifier determines that said proposed password is acceptable, such that said proposed password will not be acceptable if subsequently proposed.

24. The apparatus of claim 23 used to verify acceptability of passwords proposed by users of a plurality of secure systems linked by a communications system, wherein
each secure system invokes said verifier to verify acceptability of a password proposed for said system, and invokes said modifier to set all said indicators assigned by said mapper to said proposed password if said verifier determines that said proposed password is acceptable,
whereby a password which is acceptable will be accepted by only one of said secure systems.

25. The apparatus of claim 19 wherein said mapper comprises an encrypter that encrypts proposed passwords.

26. The apparatus of claim 19 wherein said stored table of indicators is a hash table and said mapper comprises a hash function unit that performs a hash function.

27. The apparatus of claim 26 wherein said hash function unit comprises a normalizer that normalizes a text string for a password to a standard format to create a normalized text string.

28. The apparatus of claim 27 wherein said standard format has a predetermined length.

29. The apparatus of claim 27 wherein
said text string has a length, and
said normalizer comprises an appender that appends to said text string a character related to said length of said text string, creating a modified text string.

30. The apparatus of claim 29 wherein said appender selectively adds a character to said modified text string, creating a twice modified text string having an odd length.

31. The apparatus of claim 30 wherein said normalizer further comprises a repeater that appends said twice modified text string to itself to create a thrice modified text string which exceeds a given length, and then truncates said thrice modified text string to said given length, creating said normalized text string.

32. The apparatus of claim 27 or 31 wherein said hash function unit further comprises
a divider that divides said normalized text string into pieces,
an encrypter that encrypts a predetermined input to an encrypted output using one or more of said pieces as an encryption key, and
an addresser that forms addresses of bits in said hash table using said encrypted output.

33. The apparatus of claim 32 wherein
said hash table has a length,
said encrypter encrypts N said pieces to create N encrypted outputs, and
said addresser splits said N encrypted outputs to generate final outputs, and computes one or more bit addresses in said hash table from one or more of said final outputs by computing a modulo quotient of a final output with said length of said hash table.

34. The apparatus of claim 32 further comprising
a modifier that applies said mapper to said proposed password and sets all said indicators assigned by said mapper to said proposed password, said modifier being invoked if said verifier determines that said proposed password is acceptable, such that said proposed password will not be acceptable if subsequently proposed, and wherein said encrypter encrypts in accordance with a cryptographic technique secure against known plain-text attack, whereby an attacker who monitors changes to said hash table and thereby learns that one or more indicators are assigned to a password, cannot determine said password from said indicators.

35. The apparatus of claim 34 wherein said cryptographic technique is the Data Encryption Standard.

36. Apparatus for verifying acceptability of a proposed password from a user of a secure system, comprising a stored table of indicators, a mapper that assigns one or more of said indicators to one or more passwords such that one of said indicators may be assigned to more than one of said passwords, an initializer that applies said mapper to one or more unacceptable passwords, and sets all said indicators assigned by said mapper to said unacceptable passwords, a verifier that applies said mapper to said proposed password and checks whether any one of said indicators assigned by said mapper to said proposed password is not set, and, if any one of said indicators assigned by said mapper to said proposed password is not set, determines without error that said proposed password is not one of said unacceptable passwords and therefore is acceptable, a privilege assigner that assigns privileges in said secure system to said proposed password, said privilege assigner being invoked if said verifier determines that said proposed password is acceptable, and a modifier that operates with respect to a password by applying said mapper to said password and setting all said indicators assigned by said mapper to said password, such that said password will not be acceptable if subsequently proposed, said modifier capable of being invoked with respect to further unacceptable passwords from a user, and also capable of being invoked with respect to said proposed password if said verifier determines that said proposed password is acceptable.

37. Apparatus for verifying acceptability of a proposed password from a user of a secure system, comprising a stored hash table of bits, a hash function unit that assigns said bits in said hash table to passwords, such that one of said bits may be assigned to more than one of said passwords, comprising a normalizer that normalizes a text string for a password to create a normalized text string having a predetermined length, a divider that divides said normalized text string into pieces, an encrypter that encrypts a predetermined input to an encrypted output using one or more of said pieces as an encryption key, and an addresser that forms addresses of said bits in said hash table using said encrypted output, an initializer that applies said hash function unit to one or more acceptable passwords, and sets all said bits assigned by said mapper to said unacceptable passwords, a verifier that applies said hash function unit to said proposed password and checks whether any one of said bits assigned by said hash function unit to said proposed password is set, and, if one of said bits assigned by said hash function unit to said proposed password is not set, determines without error that said proposed password is not one said unacceptable passwords and therefore is acceptable and may be assigned privileges in said secure system, a privilege assigner that assigns privileges in said secure system to said proposed password, said privilege assigner being invoked if said verifier determines that said proposed password is acceptable, and a modifier that applies said hash function unit to said proposed password and sets all said bits assigned by said hash function unit to said password, such that said password will not be acceptable if subsequently proposed, said modifier capable of being invoked with respect to further unacceptable passwords from a user, and also capable of being invoked with respect to said proposed password if said verifier determines that said proposed password is acceptable.

* * * * *

UNITED STATES PATENT AND TRADEMARK OFFICE
CERTIFICATE OF CORRECTION

PATENT NO. : 5,204,966

DATED : April 20, 1993

INVENTOR(S) : David K. Wittenberg and Jerrold S. Leichter

It is certified that error appears in the above-identified patent and that said Letters Patent is hereby corrected as shown below:

Cover page, under [56] References Cited, OTHER PUBLICATIONS, fifth reference, "Larry Cater" should be --Larry Carter--.

Cover page, under [57] ABSTRACT, line 6, "a indicator" should be --an indicator--.

Col. 3, line 67, "spell checked" should be --spell-checked--.

Col. 4, line 55, "not" should be --$\underline{not}$--.

Col. 6, line 26, "combinations" should be --$\underline{combinations}$--.

Col. 7, line 3, after "option," insert --although--.

Col. 7, line 57, "and" should be --$\underline{and}$--.

Col. 8, line 21, after "$K_{1-6}$" insert --:--.

Col. 9, line 34, "an" should by --any--.

UNITED STATES PATENT AND TRADEMARK OFFICE
CERTIFICATE OF CORRECTION

PATENT NO. : 5,204,966

DATED : April 20, 1993

INVENTOR(S) : David K. Wittenberg and Jerrold S. Leichter

It is certified that error appears in the above-indentified patent and that said Letters Patent is hereby corrected as shown below:

Col. 11, line 63, "method" should be --apparatus--.

Col. 14, line 18, "acceptable" should be --unacceptable--.

Signed and Sealed this

Twenty-third Day of May, 1995

*Attest:*

BRUCE LEHMAN

*Attesting Officer*   Commissioner of Patents and Trademarks